United States Patent
Samuel et al.

(10) Patent No.: US 12,524,437 B2
(45) Date of Patent: Jan. 13, 2026

(54) DISTRIBUTED DATA COLLECTION ACROSS MULTIPLE NODES

(71) Applicant: DELL PRODUCTS L.P., Round Rock, TX (US)

(72) Inventors: Balasingh Samuel, Round Rock, TX (US); Nikhil Vichare, Austin, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/592,277

(22) Filed: Feb. 29, 2024

(65) Prior Publication Data

US 2025/0278409 A1 Sep. 4, 2025

(51) Int. Cl.
*G06F 16/27* (2019.01)
*G06F 16/25* (2019.01)
*G06F 16/28* (2019.01)
*H04L 67/12* (2022.01)

(52) U.S. Cl.
CPC ............ *G06F 16/27* (2019.01); *G06F 16/252* (2019.01); *G06F 16/285* (2019.01); *H04L 67/12* (2013.01)

(58) Field of Classification Search
CPC ....................................................... G06F 16/27
See application file for complete search history.

(56) References Cited

U.S. PATENT DOCUMENTS

| | | | |
|---|---|---|---|
| 10,073,753 B2 | 9/2018 | Boyapelle et al. | |
| 11,496,601 B2 | 11/2022 | Khosrowpour et al. | |
| 2019/0310977 A1* | 10/2019 | Pal | G06F 9/5077 |
| 2021/0344745 A1* | 11/2021 | Mermoud | H04L 41/16 |
| 2022/0245485 A1* | 8/2022 | Cady | G06N 5/04 |
| 2023/0106985 A1* | 4/2023 | Hu | G06N 3/045 |
| | | | 706/25 |
| 2023/0118443 A1* | 4/2023 | Darji | H04L 67/306 |
| | | | 707/722 |
| 2023/0125509 A1* | 4/2023 | Ferreira | H04L 45/02 |
| | | | 706/47 |
| 2023/0128199 A1* | 4/2023 | Griffin | G06F 11/3075 |
| | | | 709/224 |

* cited by examiner

*Primary Examiner* — Mohammad S Rostami
(74) *Attorney, Agent, or Firm* — Larson Newman, LLP

(57) ABSTRACT

A remote compute device stores a first workgroup table. The first workgroup table identifies similarly profiled information handling systems for a first workgroup. A processor receives a telemetry data request from an application and determines a plurality of data sets within the telemetry data request. The processor determines a distribution of the data sets among the similarly profiled information handling systems of the first workgroup. The processor provides a different data set to a different information handling system of the first similarly profiled information handling systems. The processor receives collected data from each of the first similarly profiled information handling systems of the first workgroup and combines the collected data into complete collected data set. The processor provides the complete collected data set to the application.

20 Claims, 4 Drawing Sheets

DISTRIBUTED DATA COLLECTION ACROSS MULTIPLE NODES

FIELD OF THE DISCLOSURE

The present disclosure generally relates to information handling systems, and more particularly relates to distributed data collection across multiple nodes.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A remote compute device may store one or more workgroup tables. Each different workgroup table may identify similarly profiled information handling systems for a first workgroup. A processor may receive a telemetry data request from an application and determine a plurality of data sets within the telemetry data request. The processor may determine a distribution of the data sets among the similarly profiled information handling systems of the first workgroup. The processor may provide a different data set to a different information handling system of the first similarly profiled information handling systems. The processor may receive collected data from each of the first similarly profiled information handling systems of the first workgroup and combine the collected data into complete collected data set. The processor may provide the complete collected data set to the application.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
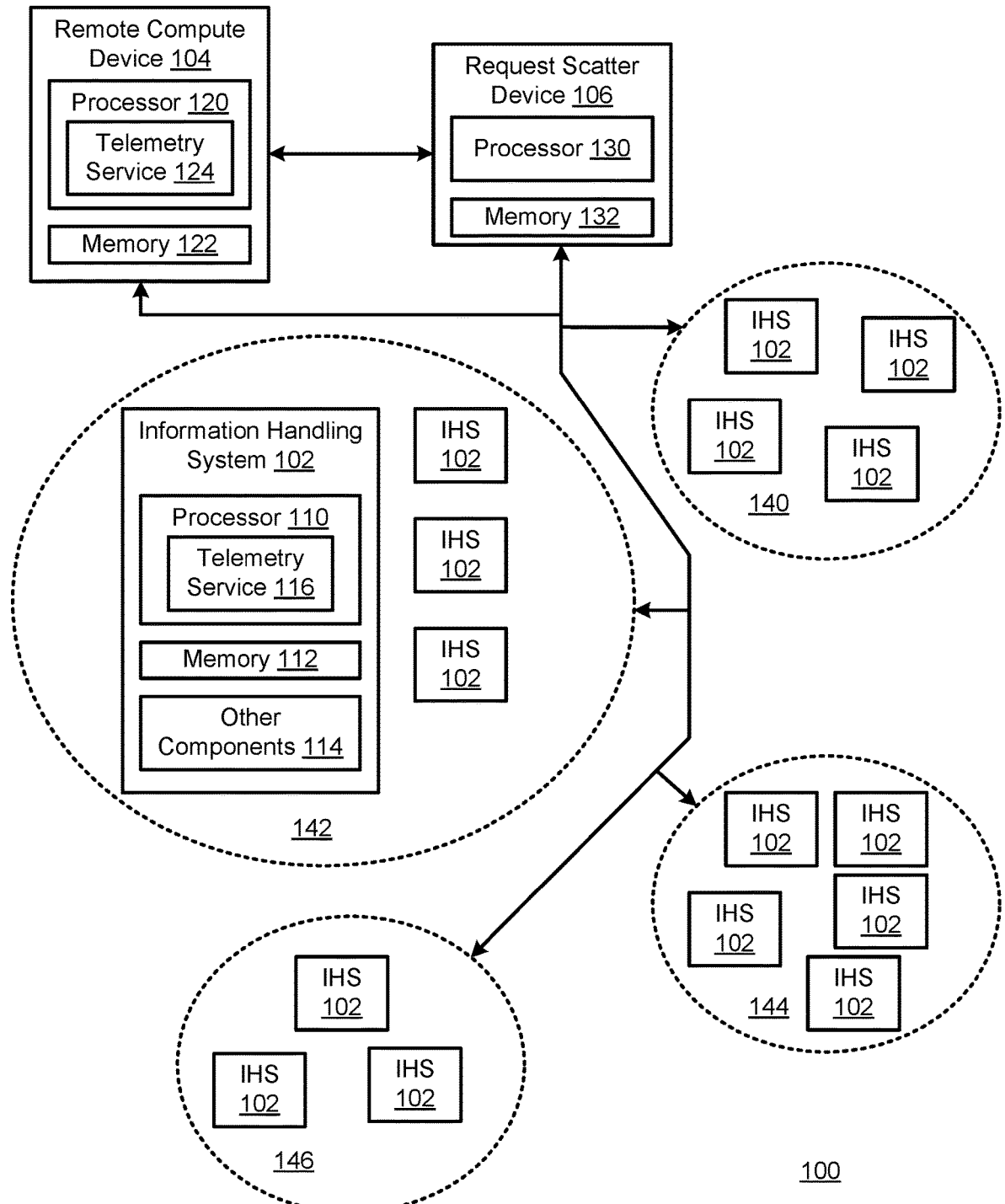
FIG. 1 is a block diagram of a portion of a system including multiple information handling systems, a remote compute device, and a request scatter device according to at least one embodiment of the present disclosure.

FIG. 1 illustrates a system 100 including multiple information handling systems 102, a remote compute device 104, and request scatter device 106 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Each information handling system 102 may include substantially similar components. For clarity and brevity, components of information handling systems 102 are illustrated and described with respect to only one of the information handling systems. Each information handling system 102 includes a processor 110, a memory 112, and other components 114. Processor 110 may execute any suitable application or services, such as a telemetry service 116. Remote compute device 104 includes a processor 120 and a memory 122. Processor 120 may execute any suitable application or services, such as a telemetry service 124. Remote scatter device 106 includes a processor 130 and a memory 132. Each of information handling systems 102, remote compute device 104, and request scatter device 106 may include any suitable number of components without varying from the scope of this disclosure.

In an example, remote compute device 104 may be any suitable device external to information handling systems 102, such as an edge compute device, a dedicated compute server, a remote cloud server, or the like. In certain examples, remote scatter device 106 may be a separate device from remote compute device 104 as illustrated in FIG. 1 or the remote scatter device may be part of the remote compute device without varying from the scope of this disclosure.

In certain examples, information handling systems 102 may be gathered or grouped into different profile workgroups 140, 142, 144, and 146. In an example, processor 120 of remote compute device may categorize or group information handling systems 102 within each of workgroups 140, 142, 144, and 146 based on determined profiles of the information handling systems. Similar profiles may include any suitable similar features, such as a similar workload execution, a similar platform, or the like. In an example, the platform of information handling systems 102 may include, but is not limited to, the operating system running of the information handling system and the hardware components In certain examples, the profile criteria may be defined by an information technology policy, may be automatically defined by the microservices tasked to run the telemetry analytics, or the like.

In an example, information handling systems 102 in a particular workgroup 140, 142, 144, or 146 may have multiple similarities with one another. Similarly, information handling systems 102 in another workgroup 140, 142, 144, or 146 may have multiple similarities with one another. However, information handling systems 102 in different workgroups may not include the same number of profile similarities as information handling systems in the same workgroup. For example, information handling systems 102 in workgroup 140 may have similar features to one another, information handling systems in workgroup 142 may have similar features to one another. However, information handling systems 102 in workgroup 140 may not have as many similarities with information handling systems in workgroup 142.

During the operation of information handling systems 102, different services within system 100 may request periodic collection of data from the information handling systems. For example, telemetry service 124 within remote compute device 104 may provide a data collection request to one or more of information handling systems 102. This data collection request may be provided based on a telemetry data request from one or more applications in remote compute device 104. In an example, the periodic data collection requests may be at a predefined or fixed frequency, at a policy-based frequency, or the like. In certain examples, periodic data collection of data from memory 112 or other components 114 within information handling system 102 may negatively impact system performance. For example, instrumenting or collecting platform-level data may require CPU cycles, memory access, input/output (IO) access, or the like. In an example, the platform-level data may include, but is not limited to, application data, power data, memory data, storage data, and network data.

In certain examples, multiple applications in information handling system 102 and/or in remote compute device 104 may request periodic data collection at the same period. The data collection may provide multiple use cases to the end-user or information technology decision maker (ITDM)

policies. In certain examples, more applications may include a data-driven approach, such as intelligent or artificial intelligence (AI) models. In this situation, data collection from the end-point device, such as information handling system 102, may increase manyfold. However, the data collection from a node, such as information handling system 102, increases the computing resource usage and negatively impacts system performance. Therefore, information handling system 102 may be improved by limiting the platform performance impact to enable multiple telemetry use cases concurrently. Information handling system 102 may be further improved by not collecting platform data from every node within a particular workgroup 140, 142, 144, and 146.

In an example, processor 120 may utilize telemetry service 124 to generate a data collection request. In certain examples, the data collection request may be associated with information handling systems 102 having a particular profile or features. In an example, memory 122 may store different profiles associated with workgroups 140, 142, 144, and 146. Based on profile associated with the data collection request and the profiles stored in memory 122, processor 120 may determine one of workgroups 140, 142, 144, and 146 as the target workgroup for the data collection request. In certain examples, the requested data may include any suitable data including, but not limited to, the speed of a cooling fan, the temperature of a central processing unit (CPU), such as processor 110, data associated with a hard drive, such as memory 112, the battery temperature, the skin temperature, E3 data, background application data, GPU temperatures, total system power, the alternating current status, and battery status. In an example, the data for memory 112 may be any suitable data, such as hard drive self-monitoring, analysis, and reporting technology (SMART) data, memory temperatures, or the like.

In certain examples, processor 120 may provide the data collection request to processor 130 of request scatter device 106. In response to the reception of the data collection request, processor 130 may determine a distribution of the requests to information handling systems 102 within the target workgroup 142. The distribution determination may be performed in any suitable manner, such as based on data retrieved from memory 132. In an example, memory 132 may include one or more workgroup tables associated with workgroups 140, 142, 144, and 146, and the workgroup tables may indicate the number of information handling systems 102 in each workgroup as illustrated in Table 1 below.

TABLE 1

| Data Group (Information Handling System) | Data Sets |
|---|---|
| 1 | |
| 2 | |
| 3 | |
| 4 | |

As illustrated in Table 1, each information handling system 102 of a workgroup may be assigned as a different data group. In the example of Table 1, the workgroup, such as workgroup 142, may have four information handling systems 102. The workgroups 140, 142, 144, and 146 may have any suitable number of information handling systems 102 and the workgroup table associated with that workgroup in memory 132 may include a corresponding number of line entries. Table 1 also includes data sets entries that processor 120 may utilize to assign particular data sets of the data collection request to different information handling systems 102. Exemplary assigned data sets to information handling systems 102 of target workgroup 142 are illustrated in Table 2 below.

TABLE 2

| Data Group (Information Handling System) | Data Sets |
| --- | --- |
| 1 | Fan speed, processor temperature |
| 2 | Battery temperature, skin (cover temperature) |
| 3 | E3 data, background application data |
| 4 | GPU temperature, memory temperature, SMART data |

After the data collection request has been separated into different data sets and assigned to information handling systems 102, as illustrated in Table 2, processor 120 may utilize the data in the corresponding workgroup table to determine how the data collection request should be scattered or distributed between information handling systems 102 of the target workgroup 142. For example, processor 130 may provide a data collection request for data sets associated with fan speed and processor temperature to one of information handling systems 102 of workgroup 142. Also, based on the workgroup table in memory 132, processor 130 may provide a data collection request for data sets associated with battery temperature and skin/cover temperature to a different information handling system 102 of workgroup 142. Processor 130 may provide a data collection request for data sets associated with E3 data and background application data to another information handling system 102 of workgroup 142.

Additionally, processor 130 may provide a data collection request for data sets associated with GPU temperature, memory temperature, and SMART data to the remaining information handling system 102 of workgroup 142. In an example, information handling systems 102 within a particular workgroup, such as target workgroup 142, may perform the same operations, such that data collected from one of the information handling systems may be same for all other information handling systems in that same workgroup. In this example, the different data set requests may be sent to and collected by different information handling systems 102 within target workgroup 142 may result in substantially similar data as compared to all of the data set requests being sent to and collected by a single information handling system in the target workgroup.

In response to receiving its corresponding data collection request, each information handling system 102 of workgroup 142 may collect the requested data sets. In an example, each information handling system 102 may collect the requested data in substantially the same manner. For clarity and brevity, the data collection will be described with respect to only one of information handling systems 102 of workgroup 142.

In an example, processor 110 may execute telemetry service 116 to collect the requested data identified in the data collection request. For example, if the data sets requested is the fourth data group of Table 2, telemetry service 116 may poll or otherwise retrieve the temperature and SMART data for memory 112 and the temperature of the graphics processing unit (GPU) in information handling system 102. In an example, the GPU of information handling system 102 may be one of other components 114. After telemetry service 116 has collected the requested data sets, processor 110 may tag the collected data and provide the tagged data to request scatter device 106. In an example, the collected data may be tagged with any suitable identifying information, such as the data group number, workgroup identifier 142, or the like. The other information handling systems 102 in workgroup 142 may similarly collect and tag the corresponding data and provide the tagged data to request scatter device 106.

In certain examples, processor 130 of request scatter device 106 may receive the tagged data and then stitch the data received from multiple information handling system 102 of workgroup 142 together into a single data set. Processor 130 may then provide the combined or stitched data set to processor 120 of remote compute device 104. Based on the reception of the combined data set, processor 120 may utilize telemetry service 124 for different use cases of the data, such as data analytics. For example, processor 120, via telemetry service 124, may provide the received data to a consumer of the data, such as one or more applications being executed in remote compute device 104. In an example, the applications in remote compute device 104 may be characterized as intelligent software applications that use the data to perform complex tasks, make predictions, automate operations, or the like. In certain examples, the tasks performed by the applications may be to determine if information handling systems 102 are running hotter and louder than a threshold level. As stated above, request scatter device 106 may be part of remote compute device 104. In this situation, processor 120 and memory 122 may perform the operations described above with respect to processor 130 and 132 without varying from the scope of this disclosure.

As described herein, processors 120 and 130 may perform different operations to collect platform-level data using a scatter-gather procedure. In certain examples, this data collection may be distributed across multiple information handling systems 102 or nodes from a similarly profiled workgroup 140, 142, 144, and 146 to reduce platform-level data instrumentation impact on each of the information handling systems. While scattering and gathering of data sets for only a single telemetry data request has been described herein, remote compute device 104 and request scatter device 106 may perform substantially similar operations for any suitable number of telemetry data requests. In an example, the different telemetry data requests may be provided to information handling systems 102 in different workgroups, such as workgroups 140, 144, and 146. In this example, the request scatter device 106 may utilize the tagged information of the collected data sets to group and assign the collected data to the proper telemetry data request.

Figure 2:
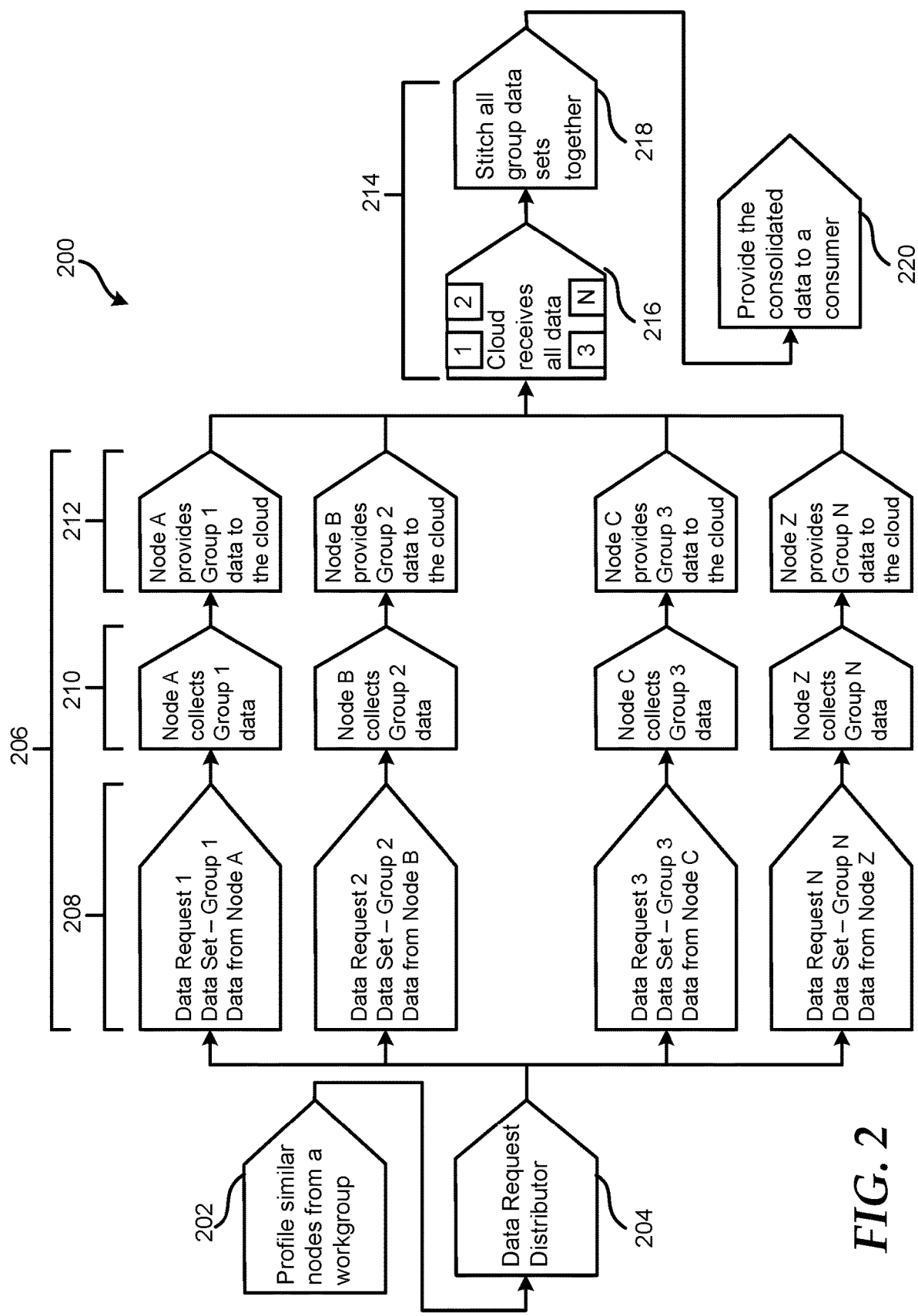
FIG. 2 is a flow diagram of a method for performing distributed data collection across multiple nodes according to at least one embodiment of the present disclosure.

FIG. 2 shows a method 200 for performing distributed data collection across multiple nodes according to at least one embodiment of the present disclosure, starting at step 202. Not every method step set forth in this flow diagram is always necessary, and certain steps of the methods may be combined, performed simultaneously, in a different order, or perhaps omitted, without varying from the scope of the disclosure. FIG. 2 may be employed in whole, or in part, processor 110 of information handling system 102, processor 120 of remote compute device 104 and processor 130 of request scatter device 106 of FIG. 1, or any other type of controller, device, module, processor, or any combination thereof, operable to employ all, or portions of, the method of FIG. 2.

At step 202, information handling systems or nodes in a system are profiled and grouped into different workgroups. In an example, each different workgroup may include a particular number of information handling systems or nodes with similar profiles that are different from the information handling systems or nodes of another workgroup. Similar profiles may include any suitable similar features, such as a similar workload execution, a similar platform, or the like. The information handling systems may be profiled in any suitable manner known in the art. In certain examples, the profiles may be static or dynamic in nature. In an example, static profiles may be always fixed based on organization, and dynamic profiles may be determined from platform indicators or analysis.

At step 204, a processor in a remote compute device may perform one or more operations to distribute a data request across multiple information handling systems. In an example, the data collection request may be spilt in any suitable manner to be provided to the multiple information handling systems. For example, the data request may be divided into the same number of data groups as the number of information handling systems in a target profiled workgroup. After the data collection request has been divided into the different groups, a scatter step 206 may be performed, and the scatter step may include different sub-steps 208, 210, and 212.

At step 208, the divided or distributed data request may be sent as individual data requests to the different information handling systems in the workgroup. In an example, the number of data requests may be equal to the number of information handling systems or nodes in the target workgroup. Each of the different data requests may include different data sets to be collected by the receiving information handling system or node. For example, one of the data sets may be associated with fan speed and processor temperature. Another one of the data sets may be associated with battery temperature and skin/cover temperature. A different one of the data sets may be associated with E3 data and background application data. Additionally, another one of the data sets may be associated with GPU temperature, memory temperature, and SMART data.

At step 210, each of the different information handling systems or nodes collects the data associated with the data set of the data group in the data request. In an example, each of the information handling systems may collect less data as compared to the complete data collection request being sent to a single information handling system. The collection of less data may result in a lower or reduced platform-level data instrumentation impact on each of the information handling systems.

At step 212, each of the different information handling systems provides the collected data to the remote compute device. In an example, the collected data may be tagged to identify the corresponding data collection request for the collected data and the data group for the collected data. After the data for each of the scattered or distributed data requests have been provided by the corresponding information handling systems, a gather step 214 may be performed, and the gather step may include sub-steps 216 and 218.

At step 216, the collected data groups are received from each of the information handling systems. At step 218, the different data groups are stitched or combined together into a complete collected data set. In an example, all the different data groups with the same data request tag information may be combined together. At step 220, the consolidated or combined data is provided to a consumer. In an example, the consumer of the data may be one or more applications. In certain examples, the applications may be characterized as intelligent software applications that use the data to perform complex tasks, make predictions, automate operations, or the like.

Figure 3:
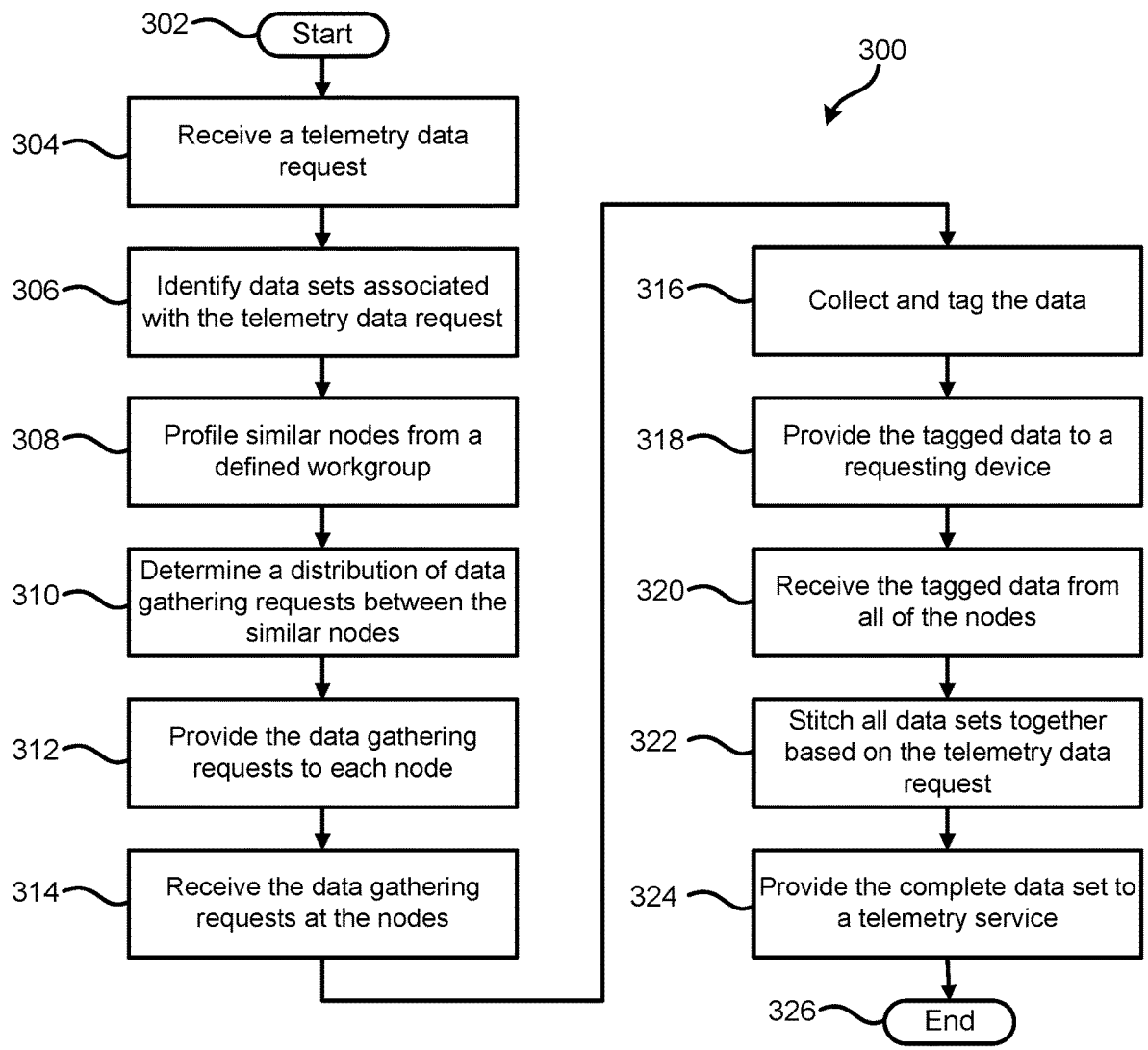
FIG. 3 is a flow diagram of a method for performing distributed data collection across multiple nodes according to at least one embodiment of the present disclosure.

FIG. 3 is a flow diagram of a method 300 for performing distributed data collection across multiple nodes according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, processor 110 of information handling system 102, processor 120 of remote compute device 104 and processor 130 of request scatter device 106 of FIG. 1, or any other type of controller, device, module, processor, or any combination thereof, operable to employ all, or portions of, the method of FIG. 3.

At block 304, a telemetry data request is received. In an example, the telemetry data request may be received from one or more applications being executed in a remote compute device. In certain examples, the remote compute device may be any suitable device external to a node or information handling system, such as an edge compute device, a dedicated compute server, a remote cloud server, or the like. In an example, the applications in the remote compute device may be characterized as intelligent software applications that use data to perform complex tasks, make predictions, automate operations, or the like.

At block 306, data sets associated with the telemetry data request are identified or determined. In certain examples, the telemetry data request may include multiple data sets, such as fan speed and processor temperature, battery temperature and skin/cover temperature, E3 data and background application data, and GPU temperature, memory temperature, and SMART data. At block 308, similar nodes from a defined workgroup are profiled. In an example, similar profiles of information handling systems may include any suitable similar features, such as a similar workload execution, a similar platform, or the like. At block 310, a distribution of data gathering requests between the similar nodes is determined. In an example, each different data group may be assigned to a different information handling system of the target workgroup.

At block 312, the data gathering requests are provided to each node in a system. At block 314, the data gathering requests are received at the nodes. At block 316, the data associated with the data gathering requests is collected and tagged. In an example, information handling systems within a target workgroup may perform the same operations, such that data collected from one of the information handling systems may be same for all other information handling systems in that same workgroup. In this example, the different data set requests may be sent to and collected by different information handling systems within the target workgroup may result in substantially similar data as comparted to all of the data set requests being sent to and collected by a single information handling system in the target workgroup. In an example, the collected data may be tagged with any suitable identifying information, such as the data group number, workgroup identifier, or the like.

At block 318, the tagged data is provided to a requesting device. In certain examples, each information handling system within the target workgroup may provide the collected and tagged data from that information handling system to a remote compute device. At block 320, all of the tagged data is received from all of the nodes or information handling systems. At block 322, all of the data sets are stitched together based on the telemetry data request. In an example, the collected data may be identified and stitched together based on the tag data provided with the collected data from the information handling system of the target workgroup.

At block 324, the complete data set is provided to a telemetry service and the flow ends at block 326. In an example, the telemetry service may provide the received data to a consumer of the data, such as one or more applications being executed in the remote compute device. In certain examples, the applications in the remote compute device may be characterized as intelligent software applications that use the data to perform complex tasks, make predictions, automate operations, or the like.

Figure 4:
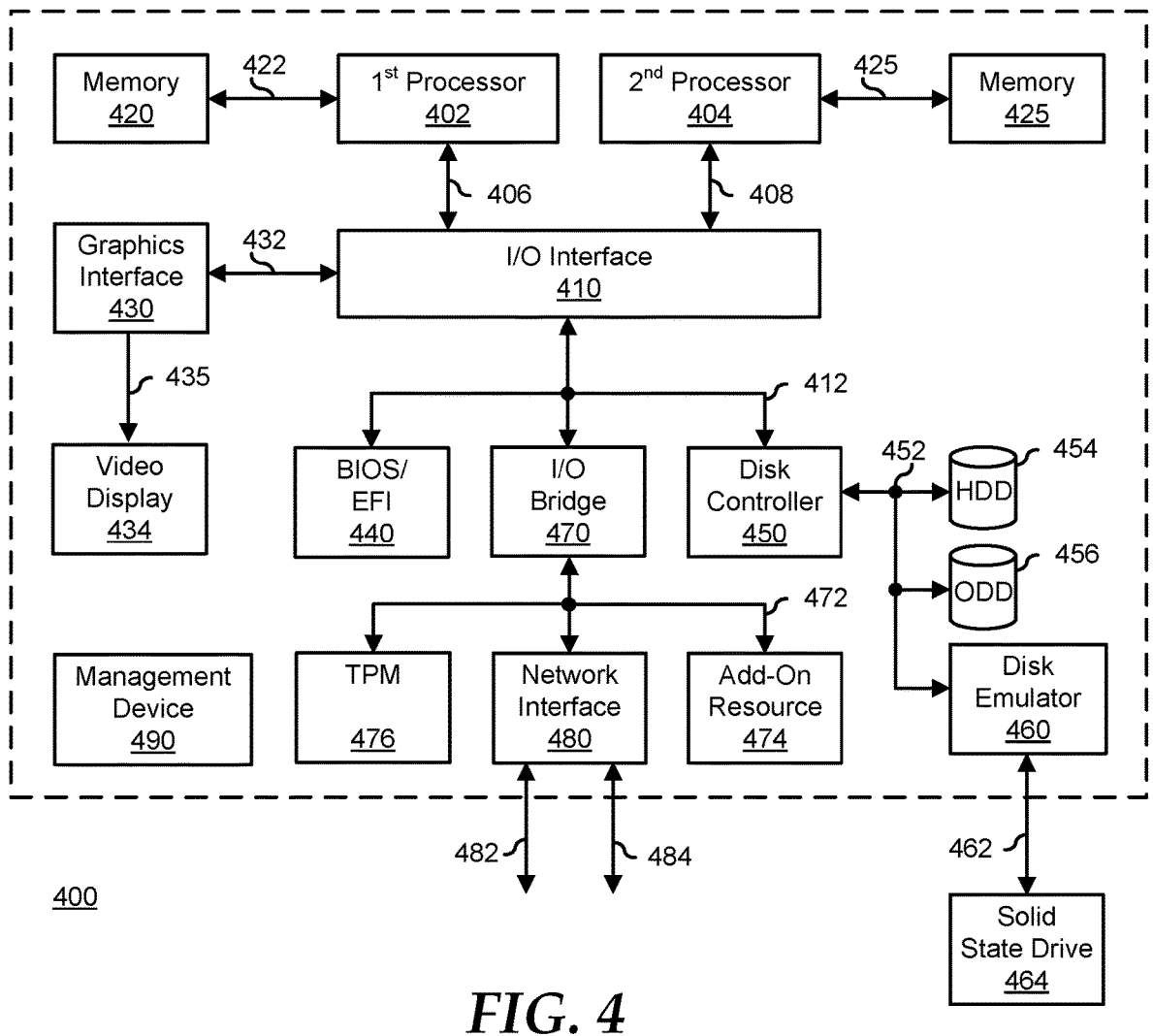
FIG. 4 is a block diagram of a general information handling system according to an embodiment of the present disclosure.

FIG. 4 shows a generalized embodiment of an information handling system 400 according to an embodiment of the present disclosure. Information handling system 400 may be substantially similar to information handling system 102 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A remote compute device comprising:
   memory to store a first workgroup table, wherein the first workgroup table identifies a first plurality of similarly profiled information handling systems for a first workgroup; and
   a hardware processor to communicate with the memory, the processor to:
   receive a telemetry data request from an application, wherein the application is a data-driven intelligent model, wherein the telemetry data request identifies data to be collected from a single information handling system of the first workgroup;
   separate the telemetry data request into a plurality of data sets, wherein a number data sets in the plurality of data sets is based on a total number of the first similarly profiled information handling systems in the first workgroup, wherein the number of data sets is less that the total number of the first similarly profiled information handling systems in the first workgroup, wherein the plurality of data sets limits a platform performance impact on the first similarly profiled information handling systems;
   determine a distribution of the data sets among the first similarly profiled information handling systems of the first workgroup;
   provide a different data set to each different information handling system of the first similarly profiled information handling systems;
   receive collected data from each of the first similarly profiled information handling systems of the first workgroup;
   combine the received collected data into complete collected data set, wherein the complete collected data set is the same as compared to all of the data sets being sent to and collected by the single information handling system of the first workgroup; and
   provide the complete collected data set to the application.

2. The remote compute device of claim 1, wherein the combining of the received collected data into complete collected data set includes the hardware processor to:
   determine that the received collected data received from each of the first similarly profiled information handling systems includes tagged data; and
   based on the tagged data, determine that the received collected data is associated with the telemetry data request.

3. The remote compute device of claim 2, wherein the tagged data includes a data group number and a workgroup identifier.

4. The remote compute device of claim 3, wherein the data group number identifies a distribution data set of the data sets for telemetry data request.

5. The remote compute device of claim 1, wherein the hardware processor further to:
   profile a plurality of information handling systems; and
   based on the information handling systems being profiled, group the information handling systems into a plurality of workgroups, wherein the first similarly profiled information handling systems are in the first workgroup and a second similarly profiled information handling systems are in a second workgroup.

6. The remote compute device of claim 5, wherein the hardware processor further to: store, in the memory, the second similarly profiled information handling systems for the second workgroup in a second workgroup table.

7. The remote compute device of claim 1, wherein the hardware processor further to: execute a telemetry service to receive the telemetry data request from the application and provide the complete collected data set to the application.

8. The remote compute device of claim 1, wherein the data sets of the telemetry data request are platform-level data sets.

9. A method comprising:
storing, by a hardware processor of a remote compute device, a first workgroup table in a memory, wherein the first workgroup table identifies a first plurality of similarly profiled information handling systems for a first workgroup;
receiving, by the hardware processor, a telemetry data request from an application, wherein the application is a data-driven intelligent model, wherein the telemetry data request identifies data to be collected from a single information handling system of the first workgroup;
separating the telemetry data request into a plurality of data sets, wherein a number data sets in the plurality of data sets is based on a total number of the first similarly profiled information handling systems in the first workgroup, wherein the number of data sets is less that the total number of the first similarly profiled information handling systems in the first workgroup, wherein the plurality of data sets limits a platform performance impact on the first similarly profiled information handling systems;
determining a distribution of the data sets among the first similarly profiled information handling systems of the first workgroup;
providing a different data set to each different information handling system of the first similarly profiled information handling systems;
receiving collected data from each of the first similarly profiled information handling systems of the first workgroup;
combining the received collected data into complete collected data set, wherein the complete collected data set is the same as compared to all of the data sets being sent to and collected by the single information handling system of the first workgroup; and
providing, by the processor, the complete collected data set to the application.

10. The method of claim 9, the combining of the received collected data into complete collected data set includes, the method further comprising:
determining that the received collected data received from each of the first similarly profiled information handling systems includes tagged data; and
based on the tagged data, determining that the received collected data is associated with the telemetry data request.

11. The method of claim 10, wherein the tagged data includes a data group number and a workgroup identifier.

12. The method of claim 11, wherein the data group number identifies a distribution data set of the data sets for telemetry data request.

13. The method of claim 9, further comprising:
profiling a plurality of information handling systems; and
based on the information handling systems being profiled, grouping the information handling systems into a plurality of workgroups, wherein the first similarly profiled information handling systems are in the first workgroup and a second similarly profiled information handling systems are in a second workgroup.

14. The method of claim 13, further comprising: storing, in the memory, the second similarly profiled information handling systems for the second workgroup in a second workgroup table.

15. The method of claim 9, further comprising: executing a telemetry service to receive the telemetry data request from the application and provide the complete collected data set to the application.

16. The method of claim 9, wherein the data sets of the telemetry data request are platform-level data sets.

17. A remote compute device comprising:
a memory to store a first workgroup table, wherein the first workgroup table identifies a first plurality of similarly profiled information handling systems for a first workgroup; and
a hardware processor to:
receive a telemetry data request from an application, wherein the application is a data-driven intelligent model, wherein the telemetry data request identifies data to be collected from a single information handling system of the first workgroup;
separate the telemetry data request into a plurality of data sets, wherein a number data sets in the plurality of data sets is based on a total number of the first similarly profiled information handling systems in the first workgroup, wherein the number of data sets is less that the total number of the first similarly profiled information handling systems in the first workgroup, wherein the plurality of data sets limits a platform performance impact on the first similarly profiled information handling systems;
determine a distribution of the data sets among the first similarly profiled information handling systems of the first workgroup; based on the determined distribution, provide a different data set to each different information handling system of the first similarly profiled information handling systems;
receive collected data from each of the first similarly profiled information handling systems of the first workgroup;
determine that the received collected data received from each of the first similarly profiled information handling systems includes tagged data;
based on the tagged data, determine that the received collected data is associated with the telemetry data request;
combine the received collected data into complete collected data set, wherein the complete collected data set is the same as compared to all of the data sets being sent to and collected by the single information handling system of the first workgroup; and
provide the complete collected data set to the application, wherein the application utilizes the complete collected data set to determine a platform-level information handling systems about the first similarly profiled information handling systems in the first workgroup.

18. The remote compute device of claim 17, wherein the hardware processor further to:
- profile a plurality of information handling systems; and
- based on the information handling systems being profiled, group the information handling systems into a plurality of workgroups, wherein the first similarly profiled information handling systems are in the first workgroup and a second similarly profiled information handling systems are in a second workgroup.

19. The remote compute device of claim 18, wherein the hardware processor further to store, in the memory, the second similarly profiled information handling systems for the second workgroup in a second workgroup table.

20. The remote compute device of claim 17, wherein the hardware processor further to execute a telemetry service to receive the telemetry data request from the application and provide the complete collected data set to the application.

* * * * *